(12) United States Patent
Bose et al.

(10) Patent No.: US 8,019,326 B2
(45) Date of Patent: Sep. 13, 2011

(54) SYSTEM AND METHOD FOR ADAPTIVE CONTEXTUAL COMMUNICATIONS

(75) Inventors: Siddhartha U. Bose, Karnataka (IN); Vinay Avasthi, Karnataka (IN); Subodh K. Sohi, Karnataka (IN)

(73) Assignee: Motorola Mobility, Inc., Libertyville, IL (US)

( * ) Notice: Subject to any disclaimer, the term of this patent is extended or adjusted under 35 U.S.C. 154(b) by 901 days.

(21) Appl. No.: 11/737,569

(22) Filed: Apr. 19, 2007

(65) Prior Publication Data

US 2008/0130845 A1 Jun. 5, 2008

Related U.S. Application Data

(60) Provisional application No. 60/868,063, filed on Nov. 30, 2006.

(51) Int. Cl.
*H04M 3/42* (2006.01)
(52) U.S. Cl. ......... 455/415; 455/406; 455/418; 455/424
(58) Field of Classification Search .................. 455/415, 455/418, 424, 406
See application file for complete search history.

(56) References Cited

U.S. PATENT DOCUMENTS

| | | | |
|---|---|---|---|
| 6,275,693 | B1 | 8/2001 | Lin et al. |
| 7,013,149 | B2 | 3/2006 | Vetro et al. |
| 2002/0161862 | A1 | 10/2002 | Horvitz |
| 2003/0016664 | A1 | 1/2003 | MeLampy et al. |
| 2003/0156108 | A1 | 8/2003 | Vetro |
| 2004/0148357 | A1 | 7/2004 | Corrigan et al. |
| 2004/0203664 | A1 | 10/2004 | Lei et al. |
| 2004/0203851 | A1 | 10/2004 | Vetro et al. |
| 2005/0093868 | A1 | 5/2005 | Hinckley |
| 2005/0097440 | A1 | 5/2005 | Lusk et al. |
| 2005/0132005 | A1 | 6/2005 | Horvitz et al. |
| 2005/0154788 | A1 | 7/2005 | Yang et al. |
| 2005/0157660 | A1 | 7/2005 | Mandato et al. |
| 2006/0034335 | A1 | 2/2006 | Karaoguz et al. |
| 2006/0094444 | A1 | 5/2006 | Hansen |
| 2006/0112179 | A1 | 5/2006 | Baumeister et al. |
| 2007/0047523 | A1* | 3/2007 | Jiang ........................ 370/352 |

FOREIGN PATENT DOCUMENTS

| | | |
|---|---|---|
| WO | 2004061608 | 7/2004 |
| WO | 2005041600 A1 | 5/2005 |
| WO | 2005046112 A2 | 5/2005 |
| WO | 2006022936 | 3/2006 |

OTHER PUBLICATIONS

3GPP SA WG2; "Voice Call Continuity Between CS and IMS Study", Dec. 1, 2005, pp. 1-153, 3GPP TR 23.806 V7.0.0 Release 7, XP002385067.

(Continued)

*Primary Examiner* — Nghi Ly

(57) ABSTRACT

A system and method for adaptive contextual communications is disclosed. A system that incorporates teachings of the present disclosure may include, for example, a call gateway having a controller element that retrieves a communication context from a call setup request directed to a called party's Terminal Device (TD) by a calling party's TD, and informs a first mapping generator of said communication context to determine a content mapping scheme for content exchanged between the calling party's and called party's TDs. Additional embodiments are disclosed.

12 Claims, 3 Drawing Sheets

OTHER PUBLICATIONS

PCT, "Notification of Transmittal of the International Search Report and the Written Opinion of the International Searching Authority, or the Declaration", Jul. 3, 2008, pp. 1-13, PCT/US2007/084610, European Patent Office.

J. Rosenberg, et al., "Indicating User Agent Capabilities in the Session Initiation Protocol", Aug. 2004, pp. 1-34, Request for Comments 3840.

J. Rosenberg, et al., "Caller Preferences for the Session Initiation Protocoll", Aug. 2004, pp. 1-25, Request for Comments 3841.

J. Rosenberg, et al., "SIP: Session Initiation Protocol", Jun. 2002, pp. 1-252, Section 11 Querying for Capabilities, Request for Comments 3261.

ISO/IEC "Information Technology—Multimedia Framework (MPEG-21) Digital Item Adaptation" International Standard, Dec. 15, 2007, Part 7, 13 pages, Switzerland.

\* cited by examiner

SYSTEM AND METHOD FOR ADAPTIVE CONTEXTUAL COMMUNICATIONS

CROSS REFERENCE TO RELATED APPLICATIONS

This application claims the benefit of U.S. Provisional Patent Application No. 60/868,063, filed Nov. 30, 2006, the entire contents of which are incorporated by reference herein.

FIELD OF THE DISCLOSURE

The present disclosure relates generally to communication systems, and more specifically to a system and method for adaptive contextual communications.

BACKGROUND

A trend towards convergence between computing and communication technologies has given consumers to select from a number of devices to perform voice, video and/or data communications (e.g., cell phones, laptop and desktop computers, Personal Digital Assistants (PDAs), Television sets, Text messaging devices, and so on). Typically a consumer's selective use of these devices is based on need, availability, and convenience. When a consumer desires to transition from a device actively engaged in a communication session to another device (e.g., cell phone to cordless phone), said consumer must terminate the communication session and re-engage it with the new device. This process can be slow, cumbersome and undesirable.

A need therefore arises for a system and method for adaptive contextual communications.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate the embodiments and explain various principles and advantages, in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION

The specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Embodiments in accordance with the present disclosure provide a system and method for adaptive contextual communications.

In a first embodiment of the present disclosure, a call gateway can have a controller element that retrieves a communication context from a call setup request directed to a called party's Terminal Device (TD) by a calling party's TD, and informs a first mapping generator of said communication context to determine a content mapping scheme for content exchanged between the calling party's and called party's TDs.

In a second embodiment of the present disclosure, a mapping generator can have a controller element that determines a content mapping scheme for content exchanged between a calling party's and called party's TDs according to a communication context associated with a call setup request initiated by the calling party's TD and one or more operating parameters of the called party's TD.

In a third embodiment of the present disclosure, a media gateway can have a controller element that adapts content exchanged between a called party's and calling party's TDs according to a content mapping scheme supplied by a mapping generator.

In a fourth embodiment of the present disclosure, a device can have a controller element that generates a Call Detail Record (CDR) comprising information associated with an exchange between first and second mapping generators that determine a content mapping scheme between first and second TDs.

Figure 1:
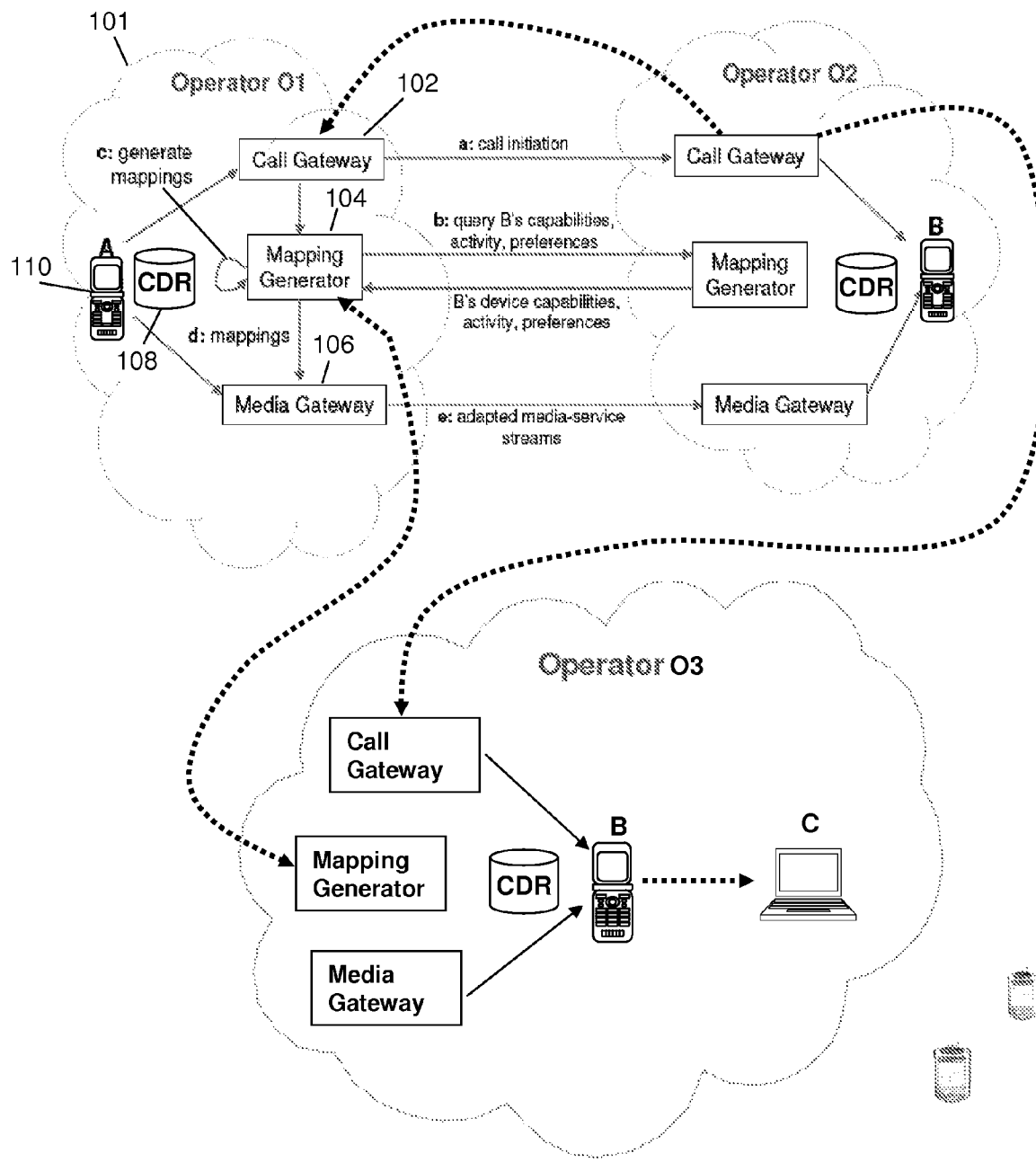
FIG. 1 depicts an exemplary block diagram of a communication system.

FIG. 1 depicts an exemplary communication system 100. The communication system 100 can comprise one or more operators that manage a network 101 having one or more Call Gateways (CGs) 102, Mapping Generators (MGs) 104, media gateways 106, and Call Detail Record (CDR) database systems 108. The CGs 102 can represent a switch for wired and/or wireless communications that can route calls, handoff calls, and/or interact with MGs 104 to establish a content mapping scheme for a communication session between terminal devices (TDs) 110. The MGs 104 can be utilized to negotiate with other MGs the content mapping scheme which is in turn used by the media gateways 106 to adapt the exchange of content between TDs 110 of disparate capabilities. The CDR database systems 108 can be utilized to record CDRs associated with the call session. TDs 110 can represent any computing device capable of wired and/or wireless communications (e.g., cell phone, cordless phone, PDA, desktop or laptop computer, set-top-box or STB, residential gateway, and so on).

The network elements of the communication system 100 (i.e., the CG, MG, media device, CDR database system, and TDs) utilize common technologies such as a controller coupled to support technologies (e.g., display, keyboard/pad, etc.) and associated communication technologies to perform the functions described in the present disclosure. Additionally, the communication system 100 can be architected to support circuit and/or packet switched technologies. For example, portions of the communication system can operate as a Public Switched Telephone Network (PSTN) utilizing SS7 as its signaling system. Other portions of the communication system can be architected according to an IP Multimedia Subsystem (IMS) architecture utilizing a Session Initiation Protocol (SIP) or derivatives thereof to support multiple embodiments of IP communications (e.g., Voice over IP, video, and data). Any number of wireless communication protocols can be supported by a portion of the network elements of said system 100 (e.g., CDMA, GSM, UMTS, EVDO, etc.).

Figure 2:
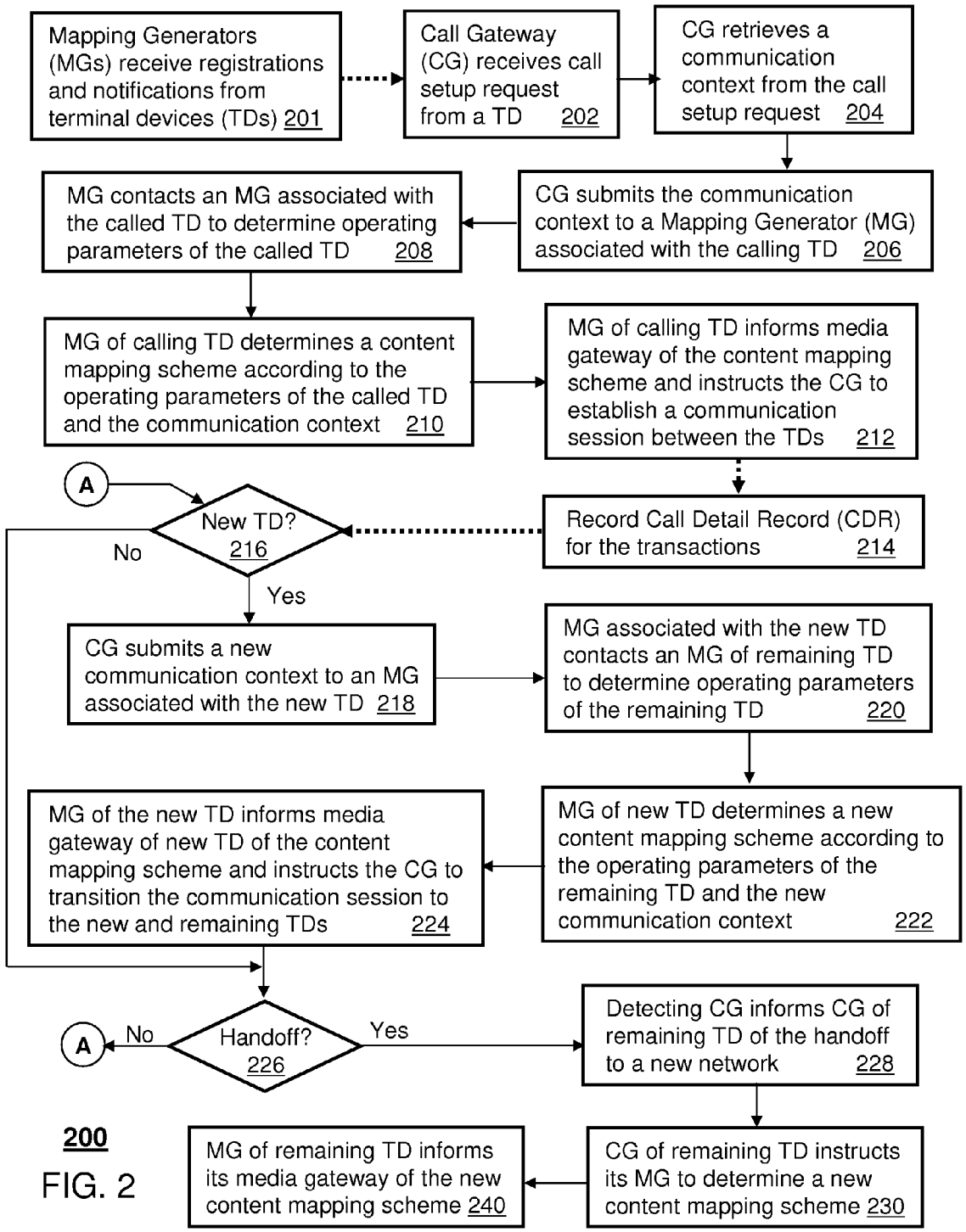
FIG. 2 depicts an exemplary flowchart of a method operating in the communication system.

FIG. 2 depicts a method 200 operating in the communication system 100. Method 200 can be utilized for establishing communication between TDs 110 having disparate functionalities as well as for transitioning communications from one TD to another while actively engaged in a communication session, and/or for adapting to a handoff from one network to another when one of the TDs roams to a new network. With these principles in mind, method 200 begins with step 201 where the MGs 104 can be programmed to monitor and/or receive registrations and/or notifications from the TDs 110. The registrations or notifications can include without limitation changes in operating parameters of the TDs 110, current user activity at the TDs, or one or more user preferences for utilizing TDs within or across networks. The aforementioned registrations and/or notifications can be utilized by the MGs 104 to determine a suitable content mapping scheme between TDs 110 as will be discussed shortly.

It should be noted that the dashed arrow between steps 201 and 202 is an indication that step 201 can occur anywhere and at anytime in the flowchart illustration of method 200. Thus the position of step 201 in the flowchart of FIG. 2 is illustrative. In this context, step 201 can be prompted in real-time by the TDs 110 and/or can be polled periodically by the MGs 104 as a background process.

In step 202 a CG 102 can receive a call setup request directed to a called party's TD 110 by a calling party's TD. In step 204, the CG 102 retrieves a communication context from the call setup request. Retrieval of the communication context can be from a signaling portion of the call setup request (e.g., SS7, SIP, H.323, etc.). The communication context identifies a type of communication session requested (voice, video, and/or data). The communication context can also identify a type of service requested (e.g., Voice over IP or VoIP, IP video, PSTN voice, streaming service, etc.). Accordingly, the communication context can be as explicit as needed to determine the service resources necessary to establish communications for the calling party's TD 110.

To assure a compatible communications between the calling and called parties' TDs 110, the CG 102 proceeds to step 206 where it submits the communication context to an MG 104 associate with the calling party's TD. The MG 104 proceeds to step 208 where it contacts an MG associated with the called party's TD 110 to determine one or more operating parameters of the called party's TD. The information retrieved from the called party's MG 104 can be stored in its memory based on a prior authorization and authentication cycle when the called party's TD 110 roamed into the network 101 or after a power-up cycle of the TD on said network. Alternatively, the MG 104 associated with the called party's TD 110 can request this information from the called party's TD in response to a request from another MG.

The operating parameters associated with the called party's TD 110 can include without limitation one or more device capabilities of the called party's TD (e.g., video, high-speed data, etc.), one or more operating preferences of the called party's TD (e.g., video for some callers and not others, instant messaging or IM preference over SMS messages, buddy list preferences, etc.), and/or one or more activities taking place at the called party's TD (e.g., active IM session, active conference call, etc.). Other suitable parameters that can prove useful for enabling communications between the called and calling party's TDs 110 can be applied to the present disclosure.

Once the operating parameters of the called party's TD 110 are known, the MG 104 of the calling party's TD 110 can determine a content mapping scheme in step 210 according to said parameters and the communication context given in step 206. The content mapping scheme can consist of a transcoding scheme that maps a video call to a voice-only call in the event that the called TD is limited to voice-only communications or has a preference for voice-only communications for certain calling parties. Other conceivable content mapping schemes can be applied to the present disclosure (e.g., voice to IM, VoIP to PSTN voice, full bandwidth video to streaming video, etc.). In step 212, the MG 104 informs a media gateway 106 associated with the calling party's TD 110 of the content mapping scheme. In this same step, the MG 104 instructs the CG 102 that received the call setup request in step 202 to establish a communication session between the calling and called parties' TDs 110. At this point, the media gateway 106 of the called party's TD 110 transcodes content exchanged between said TDs according the content mapping scheme and communication ensues.

In step 214, CDR database system 108 records the transactions taking place between the CG 102, MG 104, and media gateway 106. The dashed arrows flowing from step 212 to step 214 and from step 214 to step 216 indicate that the recordation of the foregoing activities in step 214 can take place anywhere and at anytime in the flowchart of method 200. Thus the position of step 214 in the flowchart of FIG. 2 is illustrative. In this context, step 214 can be prompted in real-time by the CG 102, MG 104, or media gateway 106 and/or can be polled periodically by the CDR database system 108 as a background process.

The information recorded can include without limitation information associated with the call setup request (e.g., calling number, Telephone Number Mapping or ENUM ID, etc.), a media type used for content exchanged between the TDs 110, a service used to deliver the media type, a duration of communication between the TDs, a type of media transcoding used by the media gateway 106, and/or information exchanged between the MGs 104 associated with the called and calling parties' TDs. The CDR can further include event information associated with the CG 102 establishing a communication session between TDs 110, a hand off managed by the CG taking place between TDs or networks, the negotiation of operating parameters of the TDs between MGs 104, the generation of the content mapping scheme used between the TDs, and/or the adaptation of content by a media gateway 106 between the TDs according to the content mapping scheme.

Either of the CGs 102 associated with the called or calling parties' TDs 102 can be further programmed in step 216 to monitor a request to transition to a new TD 110. The request can come from the new TD 110 in the form of a message indicating a desire to transition the communication session to the new TD 110. This request can be entered by the end user of said new TD 110 by way of its User Interface (UI). If a request is detected by the CG 102 in step 216, it proceeds to step 218 where it submits to an MG 104 associated with the new TD 110 a new communication context retrieved from a corresponding call setup request generated by the new TD. In step 220, said MG 104 contacts the MG of the remaining TD (i.e., the TD currently engaged in the communication session) to determine its operating parameters. In step 222, the MG 104 determines a new content mapping scheme according to the operating parameters of the remaining TD and the new communication context. The new content mapping scheme is communicated in step 224 to the media gateway 106 associated with the new TD 110. In step 224 the MG 104 further instructs the CG 102 that detected the TD 110 switch request to transition the communication session to the new TD and the remaining TD. From this point communication ensues between the new and remaining TDs 110 according to the content mapping scheme managed by the respective media gateways 106 of said TDs.

The CGs 102 thereafter proceed to step 226 to determine if a handoff between networks 101 is requested by a roaming TD 110. Alternatively, step 226 can be entered if no transition between TDs is detected by the CGs 102 in step 216. If no handoff is detected, the CGs 102 proceed back to step 216 where they again monitor for a request to switch to a new TD 110. The CGs 102 continue to check between handoffs and TD 110 switching events until the communication session is terminated between the actively engaged TDs.

If a handoff is detected by one of the CGs 102, the detecting CG proceeds to step 228 where it informs the CG of the remaining TD 110 of the imminent handoff to the new network. In step 230, the CG 102 of the remaining TD 110 instructs its MG 104 to determine a new content mapping scheme by contacting the MG of the new network to determine its capabilities. From this information, the MG 104 of the remaining TD's network formulates a new content mapping scheme which is submitted to its media gateway 106. At this point, the media gateway 106 of the remaining TD 110 adapts to the new capabilities of the new network 101.

Upon reviewing the aforementioned embodiments, it would be evident to an artisan with ordinary skill in the art that said embodiments can be modified, reduced, or enhanced without departing from the scope and spirit of the claims described below. For example, message exchanges between the CGs 102, MGs 104, and media gateways 106 can be rearranged in ways other than those presented here to accomplish the same or similar content mapping schemes. Additionally, events that trigger the steps presented by method 200 can differ without affecting the ability to nearly seamlessly support communication transitions between functionally disparate TDs while said TDs roam between operator networks or an end user transitions to another TD. These are but a few examples of modifications that can be applied to the present disclosure without departing from the scope of the claims stated below. Accordingly, the reader is directed to the claims section for a fuller understanding of the breadth and scope of the present disclosure.

Figure 3:
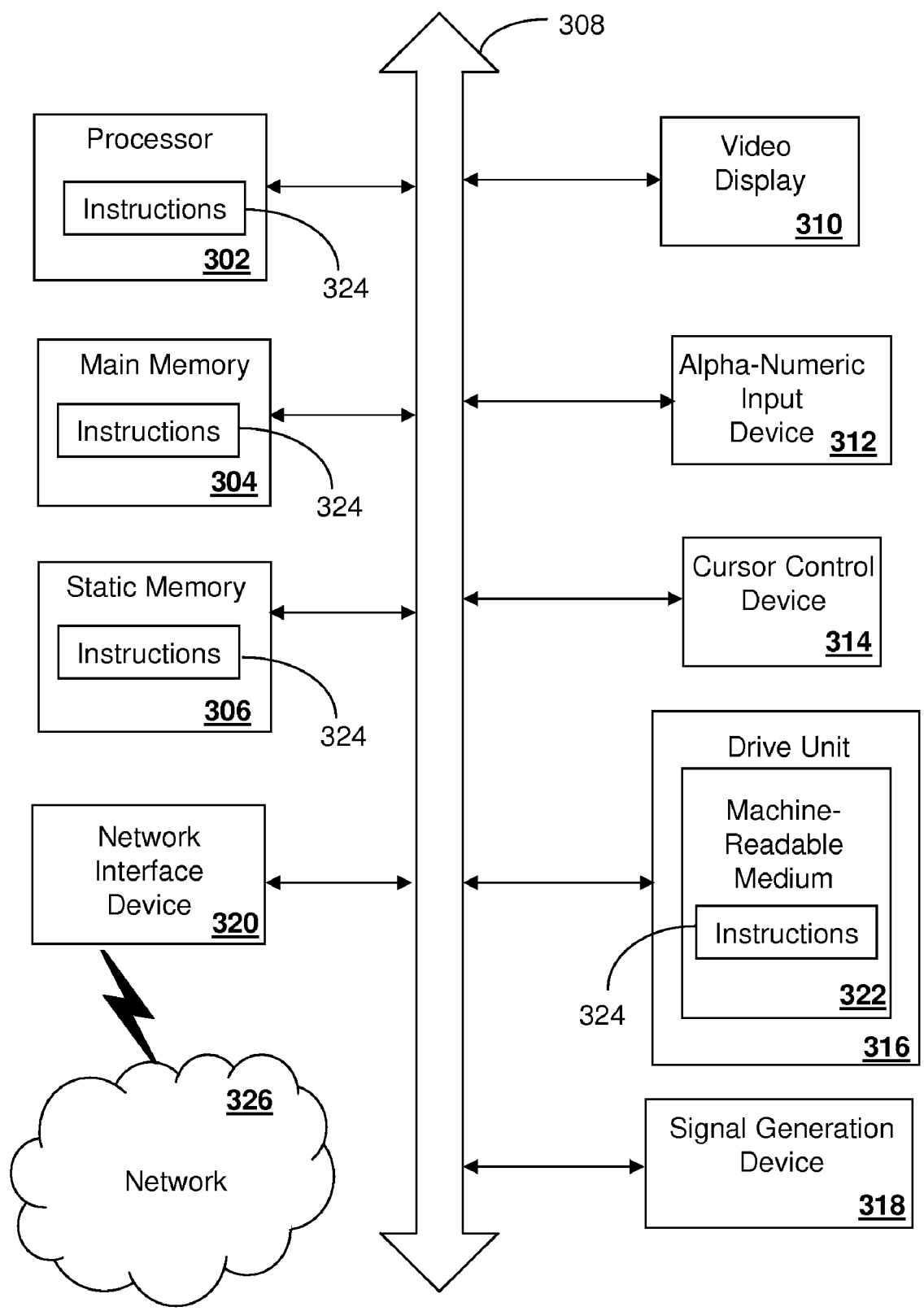
FIG. 3 is a diagrammatic representation of a machine in the form of a computer system within which a set of instructions, when executed, may cause the machine to perform any one or more of the methodologies discussed herein.

FIG. 3 is a diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A Call Gateway (CG), comprising a controller element that retrieves a communication context from a call setup request directed to a called party's Terminal Device (TD) by a calling party's TD, and informs a first mapping generator of said communication context to determine a content mapping scheme for content exchanged between the calling party's and called party's TDs wherein the first mapping generator:
    contacts a second mapping generator to determine one or more operating parameters of the called party's TD;
    determines the content mapping scheme according to the one or more operating parameters of the called party's TD and the communication context requested by the calling party's TD;
    informs a media gateway of the content mapping scheme for adapting content exchanged between the called party's and calling party's TDs; and
    instructs the controller element to establish a communication session between said called party's and calling party's TDs.

2. The CG of claim 1, wherein the communication context comprises at least one among routing a call between the calling party's and called party's TDs with one or more media streams or services established therebetween, handing off between networks a portion of a communication session established between the calling party's and called party's TDs, and monitoring the one or more media streams and services in the call, and wherein a Call Detail Record (CDR) is generated from information supplied by the controller element, the first mapping generator and the media gateway, and wherein the CDR comprises at least one among information associated with the call setup request, a media type used for content exchanged between the TDs, a service used to deliver the media type, a duration of communication between the TDs, a type of media transcoding used by the media gateway, and information exchanged between the first and second mapping generators.

3. The CG of claim 1, wherein at least a portion of the CG, the first and second mapping generators, and the media gateway conforms to an Internet Protocol Multimedia Subsystem (IMS) architecture, and wherein at least a portion of signaling information exchanged between the CG, the first and second mapping generators, and the media gateway conforms to a Session Initiation Protocol (SIP).

4. The CG of claim 1, wherein a select one of the CGs of the calling and called TDs detects a need to handoff a portion of the communication session to a new network in response to one of said TDs roaming into said new network, wherein said detecting CG instructs the CG of the remaining TD of the handoff to the new network, wherein the CG of the remaining TD instructs its mapping generator to determine a new content mapping scheme according to an exchange with a mapping generator of the new network, and wherein the mapping generator of the remaining TD informs its media gateway of the new mapping scheme.

5. The CG of claim 1, wherein the controller element:
    detects a desire by the calling party or the called party to transition to a new TD, and
    instructs a mapping generator associated with the new TD to determine a new mapping scheme for content exchanged between the new TD and the remaining TD.

6. The CG of claim 5, wherein the controller element:
    receives a new call setup request from the new TD,
    retrieves a new communication context from the new call setup request, and
    informs the mapping generator associated with the new TD of the new communication context.

7. The CG of claim 6, wherein the mapping generator associated with the new TD:
  contacts the remaining mapping generator to determine one or more operating parameters of the remaining TD, and
  determines a new content mapping scheme according to the one or more operating parameters of the remaining TD and the new communication context.

8. The CG of claim 7, wherein the mapping generator associated with the new TD:
  informs a media gateway associated therewith of the new mapping scheme for adapting content exchanged between the new TD and the remaining TD, and
  instructs the controller element to transition the communication session to the new TD and the remaining TD.

9. A mapping generator, comprising a controller element that determines a content mapping scheme for content exchanged between a calling party's and called party's Terminal Devices (TDs) according to a communication context associated with a call setup request initiated by the calling party's TD and one or more operating parameters of the called party's TD, wherein the controller element:
  contacts a second mapping generator to determine one or more operating parameters of the called party's TD;
  receives the communication context from a Call Gateway (CG) that retrieves said communication context from the call setup request;
  informs a media gateway of the content mapping scheme for adapting content exchanged between the called party's and calling party's TDs; and
  instructs the CG to establish a communication session between said called party's and calling party's TDs.

10. The mapping generator of claim 9, wherein the one or more operating parameters comprise at least one among one or more device capabilities of the called party's TD, one or more preferences of the called party, and one or more user activities taking place at the called party's TD.

11. The mapping generator of claim 9, wherein at least a portion of the CG, the first and second mapping generators, and the media gateway conforms to an Internet Protocol Multimedia Subsystem (IMS) architecture, wherein at least a portion of signaling information exchanged between the CG, the first and second mapping generators, and the media gateway conforms to a Session Initiation Protocol (SIP), and wherein a Call Detail Record (CDR) is generated from information supplied by the CG, the mapping generator and the media gateway.

12. The mapping generator of claim 9, wherein the controller element receives a registration or notification of at least one among changes in operating parameters of the calling party's or called party's TD, current user activity at the calling party's or called party's TD, and one or more preferences of the called or calling party within or across networks.

* * * * *